United States Patent
Ebner et al.

(10) Patent No.: US 7,754,798 B2
(45) Date of Patent: Jul. 13, 2010

(54) OXYGEN SCAVENGER BLOCK COPOLYMERS AND COMPOSITIONS

(75) Inventors: Cynthia L. Ebner, Greer, SC (US); Arthur L. Berrier, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 1626 days.

(21) Appl. No.: 10/649,747

(22) Filed: Aug. 28, 2003

(65) Prior Publication Data

US 2005/0048287 A1    Mar. 3, 2005

(51) Int. Cl.
    *C08K 3/00*     (2006.01)
    *B32B 33/00*    (2006.01)
(52) U.S. Cl. .................. 524/401; 428/411.1; 428/412
(58) Field of Classification Search ............ 252/188.28; 428/412
    See application file for complete search history.

(56) References Cited

U.S. PATENT DOCUMENTS

| | | | | |
|---|---|---|---|---|
| 4,038,228 A | * | 7/1977 | Taylor .......................... | 523/126 |
| 4,485,228 A | * | 11/1984 | Chang et al. ................... | 528/84 |
| 4,536,409 A | | 8/1985 | Farrell et al. ................. | 426/398 |
| 4,702,966 A | | 10/1987 | Farrell et al. ................. | 428/500 |
| 5,021,515 A | | 6/1991 | Cochran et al. ............... | 525/371 |
| 5,133,739 A | * | 7/1992 | Bezwada et al. .............. | 606/230 |
| 5,166,309 A | | 11/1992 | Maj et al. ..................... | 528/272 |
| 5,211,875 A | | 5/1993 | Speer et al. ............... | 252/188.28 |
| 5,281,360 A | | 1/1994 | Hong et al. ............... | 252/188.28 |
| 5,399,289 A | | 3/1995 | Speer et al. ............. | 252/188.28 |
| 5,604,043 A | | 2/1997 | Ahlgren ....................... | 428/518 |
| 5,700,554 A | | 12/1997 | Speer et al. .................. | 428/220 |
| 5,859,145 A | | 1/1999 | Ching et al. ............. | 525/330.6 |
| 6,083,585 A | | 7/2000 | Cahill et al. ................ | 428/35.7 |
| 6,254,803 B1 | | 7/2001 | Matthews et al. ....... | 252/188.28 |
| 6,254,804 B1 | | 7/2001 | Matthews et al. ....... | 252/188.28 |
| 6,346,308 B1 | | 2/2002 | Cahill et al. ................ | 428/35.7 |
| 6,365,247 B1 | | 4/2002 | Cahill et al. ................ | 428/35.7 |
| 6,458,437 B1 | * | 10/2002 | Ito et al. ..................... | 428/35.1 |
| 6,544,611 B2 | | 4/2003 | Cahill et al. ................ | 428/35.8 |

FOREIGN PATENT DOCUMENTS

| | | |
|---|---|---|
| AU | 199656326 | 12/1996 |
| DE | 1900181 | 10/1969 |
| WO | 99/48963 | 9/1999 |
| WO | WO 02/49923 | 6/2002 |

* cited by examiner

*Primary Examiner*—James Seidleck
*Assistant Examiner*—Saira Haider
(74) *Attorney, Agent, or Firm*—Howard Troffkin

(57) ABSTRACT

An oxygen scavenger composition includes a block co-polymer having at least one block including a polyester condensation polymer segment having cycloalkenyl group(s) or functionality directly or indirectly bonded to the polymer chain of said block, and having at least one second block including a polymer segment of a thermoplastic, film forming material. The block copolymer has been found to act as an oxygen scavenger agent under both ambient and refrigerated conditions, to be compatible with conventional film forming packaging materials, and to provide compositions exhibiting low tack which can be readily formed and processed using conventional film forming equipment. A packaging material, such as a film or laminated product suitable for packaging applications, can include the oxygen scavenger composition.

28 Claims, No Drawings

OXYGEN SCAVENGER BLOCK COPOLYMERS AND COMPOSITIONS

FIELD OF THE INVENTION

The invention relates to an oxygen scavenger composition and packaging material.

BACKGROUND OF THE INVENTION

Limiting the exposure of oxygen-sensitive materials, e.g. food products, meats, beverages, pharmaceuticals, etc., to oxygen exposure provides a means to maintain and enhance the quality and shelf life of the packaged product. For example, packaging a food product in a package capable of minimizing oxygen exposure is a means to maintain the quality of the packaged product over an extended time and to retard spoilage of the product so that the product is maintained in inventory longer without wastage and the need for restocking and replacement.

When a container is formed of a metal or glass body and is provided with a hermetically sealed closure, the permeation of oxygen through the body and the closure is theoretically impossible because of the impermeability of the materials from which the body and closure are formed. Metal cans may reliably prevent oxygen ingress. However, in both instances some oxygen ingress may occur by diffusion through the gasket or the like positioned between the container body and its lid. When a container is formed of a plastic material, such as a bottle, plastic bag, film, tray or lid, the permeation of oxygen through the body becomes an issue of importance. Further, the quality of the packaged material tends to deteriorate over time, in part because of dissolved oxygen typically present in the packaged material at the time it is placed in the packaging container and also in part due to oxygen ingress which occurs during storage. It has long been recognized that when conventional containers of these types are used for the storage of oxygen sensitive materials, the shelf life of the stored materials is limited.

In the food packaging industry, several techniques have been developed to limit oxygen-sensitive packaged materials to oxygen exposure. Such techniques include the use of a barrier material or layer (a material or layer having low permeability to oxygen) as part of the packaging; the inclusion of some means capable of consuming oxygen other than the packaging material (e.g. through the use of sachets and the like having material capable of reacting with oxygen); and the creation of a reduced oxygen environment within the package (e.g. modified atmosphere packaging (MAP) and vacuum packaging).

Although each of the above techniques has its place in the industry, it is well recognized that the inclusion of an oxygen scavenger as part of a packaging article is one of the most desirable means of limiting oxygen exposure.

It is known to include an oxygen scavenger in a sheet material. The oxygen scavenger reacts with oxygen that is trapped in the package or that permeates into the package. For instance, this is described in U.S. Pat. Nos. 4,536,409 and 4,702,966 and the prior art discussed in these references. The inclusion of oxygen scavengers within the cavity of the package is a form of "active packaging", i.e., the modification of the package to accommodate a means to regulate oxygen exposure. Normally, the modification is in the form of a sachet or the like introduced into the package cavity. Such active packaging devices have the disadvantages of requiring additional packaging operations, potential breakage of the sachet causing contamination of the packaged goods, and uneven or localized scavenging.

Alternately, regulating the exposure to oxygen involves incorporation of an oxygen-scavenging agent directly into the packaging structure itself. For example, oxygen-scavenging agents have been utilized as part of the package element (film, gasket, coating, etc.) rather than by the addition of a separate structure to the package. Such application has been found to provide a more uniform scavenging effect throughout the package and to provide a means of intercepting and scavenging oxygen as it passes through the walls of the package (herein after referred to as "active barrier" application). Incorporation of a scavenger agent is also used to consume oxygen contained in the packaging article either as residual air oxygen in the packaged goods and/or in the void space within the packaging article not occupied by the packaged goods (herein after referred to as "headspace oxygen scavenging" applications). Headspace oxygen scavenging normally entails the removal of large quantities of oxygen from the interior of the package.

Various agents have been proposed as oxygen scavengers. For example, Michael Rooney, in his article "Oxygen Scavenging: A Novel Use of Rubber Photo-Oxidation", Chemistry and Industry, Mar. 20, 1982, Pg. 197-198, describes the use of ethylenically unsaturated compounds as oxygen scavengers when exposed to light.

Attempts to produce active oxygen scavenging barrier products include the incorporation of inorganic powders and/or salts into a polymer matrix used to form packaging. Incorporation of such powders and/or salts has been found to cause degradation of the transparency and mechanical properties (e.g. tear strength) of the packaging material and cause processing difficulties in the fabrication of the packaging material.

Attempts have been made to produce active oxygen scavenging barrier products in which a polyamide-metal catalyst system capable of scavenging oxygen is incorporated into a polymeric packaging material. This polyamide based system has the disadvantages of incompatibility with thermoplastic polymers normally used in forming flexible packaging materials, reduced flexibility and heat sealability of the resultant packaging material, and degradation of the polymer's physical properties and structure upon reaction with oxygen.

U.S. Pat. No. 5,399,289, incorporated herein by reference in its entirety, teaches the use of ethylenically unsaturated hydrocarbon polymers (e.g. polybutadiene and like), and copolymers and polymer blends thereof formed by free radical polymerization. This reference teaches that the unsaturation should be limited to 0.01 to 10 equivalents per 100 grams of polymer as the adsorption of oxygen by such systems causes fission of the polymer backbone chain. Such polymers, when reacting with oxygen, normally degrade to low molecular weight products via chain scission and the resultant oxidation by-products can cause degradation of the taste, color and odor of the packaged material (e.g. food products). Further, because these polymers are amorphous, packaging compositions formed with conventional semi-crystalline polymer matrices are difficult to be blended and processed.

While the prior art compounds may effectively scavenge oxygen, they introduce other problems into packaging. For instance, in summary, the prior art teaches the incorporation of compounds which are ethylenically unsaturated but which often cleave as a consequence of the reactions of the oxygen scavenging process. For example, films containing unsaturated compounds, such as squalene or vegetable oils, produce large amounts of volatile aldehydes and ketones upon oxidation. Unfortunately many of the resultant volatile compounds are not maintained within the film structure and find their way into the headspace of the package. Here they have the potential to degrade the taste, color and/or odor of comestible products.

U.S. Pat. No. 6,254,803 discloses polymers having at least one cyclohexenyl group or functionality as being useful as oxygen scavengers. This reference includes the use of condensation polymers formed from tetrahydrophthalic anhydride, the free acid, and the ester or diester derivatives with a diol or polyol reagent. For example, when the cyclohexenyl containing reactant is a free acid, an anhydride or ester group, the reference teaches that diols, e.g. butanediol, may be used as a co-reactant. Alternatively, the condensation polymer may be formed from a tetrahydrobenzyl alcohol or the corresponding amine or other cyclohexenyl amine which is reacted with compounds having a plurality of functional groups selected from carboxylic acid, acid halide, acid anhydride, isocyano or mixtures thereof. The teachings of U.S. Pat. No. 6,254,803 are incorporated herein in its entirety by reference.

Although polymers formed from tetrahydrophthalic anhydride and the like according to U.S. Pat. No. 6,254,803 do not generate large amounts of oxidation fission products during scavenging, they have limited utility in applications (e.g. refrigerated headspace oxygen scavenging) where a low $T_g$ is necessary. When this requirement is met, the referenced polymers, in addition to having low $T_g$, exhibit low melting point, high melt flow index, high tack properties and are viscous liquids at ambient temperature conditions. Such polymers are not pelletizable or readily handled, and are difficult to process into films and other packaging articles using conventional processing equipment. They can provide a resultant product that may not be acceptable for packaging applications.

Ideally, a polymeric material useful in an oxygen scavenging composition should exhibit good processing characteristics, be able to be formed into useful packaging materials, have high compatibility with those polymers commonly used to make packaging materials, and not contain or produce by-products which detract from the color, taste, or odor of the packaged product. Further, the resultant oxygen scavenging composition should be active both under ambient and refrigerated temperature conditions for either headspace oxygen scavenging applications or "active barrier" scavenging applications.

The present invention seeks to address the problems associated with the polymers produced according to U.S. Pat. No. 6,254,803, by seeking to provide compositions that 1) act as oxygen scavengers in packaging applications while minimizing the migration of low molecular weight products out of the packaging material containing the compositions and into packaged goods, and/or 2) can be used under both ambient and refrigerated conditions, and/or 3) can be used for refrigerated headspace scavenging applications, and/or 4) when reacted with oxygen, produce very low quantities of scission and oligomeric by-products, and/or 5) can be readily processed using conventional film forming equipment (e.g. extrusion equipment) or coating equipment to provide a film substantially free of defects, and which can be readily handled to provide a finished packaged article.

It has been found that an oxygen scavenger composition can be provided by a block co-polymer having at least one polymer block having cycloalkenyl groups or functionalities bonded to the polymer chain and, in addition, having at least one polymer block comprising a thermoplastic, film forming polymer. The block co-polymer, as fully described herein below, provides an oxygen scavenger composition having the desired combination of properties indicated above.

SUMMARY OF THE INVENTION

The present invention is directed to an oxygen scavenger composition comprising a block co-polymer having at least one block containing cycloalkenyl group or functionality and, further, having at least one second polymer block comprising a thermoplastic, film forming polymer. The present block copolymer has been found to act as an oxygen scavenger agent under both ambient and refrigerated conditions, to be compatible with conventional film forming packaging materials, and to provide compositions exhibiting low tack which can be readily formed and processed using conventional film forming equipment.

Further, the present invention is directed to a film or laminated product suitable for packaging applications composed of at least one layer when in the form of a film or a plurality of layers when in the form of a laminated product, wherein at least one layer of said film or laminated product comprises a block co-polymer composition having at least one block composed of a polyester condensation polymer segment having cycloalkenyl group(s) or functionality directly or indirectly bonded to the polymer chain of said block and having at least one second block formed of a polymer segment composed of a thermoplastic, film forming material, as fully described herein below.

The present invention, alternatively, is directed to a film or laminated product suitable for packaging applications having at least one layer when in the form of a film or a plurality of layers when in the form of a laminated product, wherein at least one layer of said film or laminated product comprises a polymeric composition comprising a diluent polymer having substantially uniformly distributed therein said block co-polymer, as fully described herein below.

DETAILED DESCRIPTION

The present invention can be used in packaging articles having various forms. Suitable articles include, but are not limited to, flexible sheet films, flexible bags, rigid containers or combinations thereof. Typical flexible films and bags include those used to package various food items and may be made up of one or a multiplicity of layers to form the overall film or bag-like packaging material. The oxygen scavenger composition of the present invention can be used in one, some or all of the layers of such packaging material. Materials in the form of flexible films and bags normally have thickness ranging from 5 to 260 micrometers.

Typical rigid or semi-rigid articles include plastic, paper or cardboard containers, such as those utilized for juices, soft drinks, as well as thermoformed trays or cup normally have wall thickness in the range of from 100 to 1000 micrometers. The polymeric oxygen scavenger of the present invention can be used as an integral layer or as a coating of the formed semi-rigid or rigid packaging article.

Although it may be preferable from the standpoint of packaging convenience and/or scavenging effectiveness to employ the present invention as an integral part of the packaging wall, the invention can also be used as a non-integral component of this packaging article such as, for example, bottle cap liner, adhesive or not-adhesive sheet insert, sealants, sachet, fibrous mat insert and the like.

Besides packaging articles applicable for food and beverage, packaging for articles for other oxygen-sensitive products can also benefit from the present invention. Such products would include pharmaceuticals, oxygen sensitive medical products, corrodible metals or products, electronic devices and the like.

Although it has been previously reported (See U.S. Pat. No. 6,254,803) that polymers containing certain cyclohexenyl functionalities are good oxygen absorbers when compounded with a transition metal salt and, optionally, a photoinitiator, the use of such polymeric materials, when prepared as necessary for refrigerated oxygen scavenging conditions, has been limited due to the fact that they exhibit low Tg, low melting point, high melt flow index, high tack properties and are viscous liquids at ambient temperature conditions. These properties cause difficulties in conventional processing techniques (e.g. extrusion of films and the like) and handling of the finished product.

It has now been found that block co-polymer compositions having at least one block composed of a polyester condensation polymer segment having cycloalkenyl group(s) or functionality directly or indirectly bonded to the block polymer chain and having at least one second block formed of a polymer segment composed of a thermoplastic, film forming material, provide improved compositions which maintains a low Tg, yet is a non-tacky, solid substance at ambient temperature conditions. The present polymers are capable of being readily processed by conventional techniques. Further, the resultant materials have good handling properties and are capable of effectively scavenging oxygen under both ambient (20° C. to 30° C.) and refrigeration (less than 20° C. to minus 20° C., such as from 10° C. to minus 15° C., 5° C. to minus 10° C., and 5° C. to minus 5° C.) conditions.

The following terms shall have the following meaning when used in the present specification and appended claims unless a contrary intention is expressly indicated:

"aromatic" shall refer to organic molecules and groups having at least one six carbon ring of the benzene and related series or the condensed six carbon rings of naphthalene and related series; said groups may be referred to as aryl, alkaryl or aralkyl groups and the like.

"block" shall refer to a polymer segment of a polymer having a molecular weight ($M_w$) of at least 1000, such as at least 2000.

"block co-polymer" shall refer to a polymer having at least two polymer segments and is distinct from random copolymers of two or more different mer units. The polymer segments of "A" and "B" may be, for example (using linear configuration for illustrative purposes) in the form of AB, ABA, BAB. $A(BA)_nB$ or $B(AB)_nAB$ or $A(BA)_nBA$ or the like configuration.

"condensation polymer" shall mean a polymerization product formed by the union of like or unlike molecules which are covalently bonded by a reaction of groups on each molecule with the elimination of water, acid, alcohol or the like, such as the reaction of a hydroxyl group with a carboxylic acid group, an amine group with a carboxylic acid group, a carboxylic acid anhydride group with a hydroxyl group and the like.

"functional group" shall mean alcohol, carboxylic acid anhydride, carboxylic acid ester, carboxylic acid, halogen, primary, secondary, or tertiary amine, aldehyde, ketone, hydroxyl or sulfonyl group.

"film" shall mean an article suitable for packaging application or suitable for forming an article useful for packaging application wherein the article comprises a flexible article having extended length and width dimensions and a thickness of from 5 to 260 micrometers composed of at least one layer wherein at least one layer is composed of the block copolymer oxygen scavenging composition of the present invention.

"film forming polymer" shall refer to polymers known by those skilled in the art to be capable of forming a flexible, translucent or transparent product having length and width dimensions that are at least 100 times that of the thickness dimension of said product. A polymer, which is capable of forming a membrane-like product.

"high melting point" shall refer to polymers of a polymer segment composition of the present block co-polymer having a $T_m$ of higher than +30° C., such as higher than +40° C., and from +45° C. to +55° C.

"hydrocarbyl" shall mean a univalent or divalent organic group composed of hydrogen and carbon, such as group containing 1 to 40 carbon atoms.

"laminated product" shall mean an article suitable for packaging application or suitable for forming an article useful for packaging application wherein the article has a thickness of from 100 to 2000 micrometers, comprises a plurality of layers having at least one layer composed of the polymeric oxygen scavenging composition of the present invention and having at least one additional layer composed of a flexible, semi-rigid or rigid material, such as, for example, a polymeric film, a polymeric structure, a paper film or structure, a cardboard film or structure, a metal film or structure or the like.

"low melting point" shall refer to polymers of a polymer segment composition of the present block co-polymer having a $T_g$ of lower than minus 20° C., such as lower than minus 30° C.

"packaging material" shall generically refer to a flexible film, laminated product and non-integral component suitable for use as part of a packaging article.

"polyester" shall mean a polymerization product having two or more distinct monomeric units which are covalently bonded by the reaction of a hydroxyl group of one unit with a carboxyl group (free carboxylic acid, the anhydride or a hydrocarbyl ester) of another unit.

"polymer" shall mean a polymerization product composed of a multiplicity of monomeric units (also referred to as "mer units"). The polymer may be a homopolymer composed of a plurality of like monomeric units or a copolymer composed of a plurality of two or more distinct monomeric units.

"polymer segment" shall refer to a portion of a polymer formed from a multiplicity of the same mer units or a plurality of mer units to provide repeating units within the segment. With respect to physical properties described herein in association with a particular polymer segment, the polymer segment shall be viewed as an individual polymer product unless otherwise specifically indicated.

"prepolymer" shall refer to a polymer suitable for use in forming a polymer segment "A" or "B" of the block co-polymer of the instant invention.

"thermoplastic" shall refer to polymers of a polymer segment composition of the present block co-polymer that is capable of softening when heated to temperatures above room temperature and hardens again when cooled below said temperature.

The oxygen scavenger polymer of the present invention comprises a block co-polymer having at least one polymeric block comprising a polycondensation prepolymer ($P^A$) having mer units derived from condensation reaction of:

(a) at least one or a mixture of substituted alicyclic compounds having non-aromatic, ethylenic functionality according to the following representation:

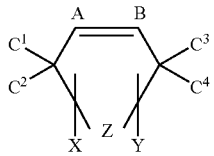

wherein

A, B, C¹, C², C³, C⁴ each independently represents hydrogen or a $C_qH_{2q+1}$ hydrocarbyl group with q being an integer in the range of from 0 to 20, provided that either A or B and at least one of C¹, C², C³, C⁴ are hydrogen atoms and each carbon atom of the alicyclic ring is fully substituted by hydrogen, a hydrocarbyl group or an X or Y group to complete its valence state;

X and Y each independently or together represents functional groups that are capable of being part of a heteroatom containing linkage forming a covalent bond linkage between the cycloalkenyl group and other monomeric groups forming the condensation prepolymer and/or between said condensation prepolymer and the thermoplastic prepolymer segments of the resultant block copolymer. For example, said functional group (both can be a functional group of same identity or an anhydride group) selected from —$(CH_2)_n$—OH, —$(CH_2)_n$—$NH_2$, —$(CH_2)_n$—N=C=O and —$(CH_2)_n$—C(=O)-D with n being an integer in the range from 0 to 20 and D being selected from a halide atom or an OR group where R is an —H or $C_1$-$C_{12}$ alkyl group, or X and Y together represent —$(CH_2)_n$—C(=O)$_x$-D when D is oxygen, n is an integer of from 0 to 20 and x is 2; and Z representing a —$(C_tH_{2t})$— hydrocarbylene group with t being an integer of from 1-4: and (b) at least one or a mixture of di- or polyfunctional hydrocarbon compounds according to the following representation:

G-R'-(G)$_x$ wherein

R' represents a non-aromatic or aromatic hydrocarbon group, such as, for example hydrocarbyl groups selected from a straight or branched chain alkyl, cycloalkyl, aryl, alkaryl or aralkyl group, any of which may contain heteroatoms which are substantially inert with respect to the condensation polymerization and the oxygen scavenging; and G represents a functional group capable of being part of a heteroatom containing linkage between the hydrocarbyl group and the other monomeric groups forming the condensation polymer, illustrative examples of said functional group being described herein above with respect to X and Y; and x is an integer of at least one, such as from 1 to 5 as, for example, from 1-3.

Examples of monomer (a) used to form said condensation prepolymer ($P^A$) may include but are not limited to 1,2,3,6-tetrahydrophthalic acid, cis-1,2,3,6-tetrahydrophthalic anhydride, dimethyl-cis-1,2,3,6-tetrahydrophthalate, 3-cyclohexene-1,1-dimethanol, 3,4,5,6-tetrahydrophthalic anhydride, 4-cyclohexene-1,2-diacetic acid, 3-cyclohexene-1,2-diacetic acid, 1-cyclohexene-1,4-dimethanol, 1-cyclohexene-1,2-dimethanol, 3-methyl-4-cyclohexene-1,2-diacetic acid, 1,2,3,6-tetrahydrophthalic acid, dimethyl ester, cis-dimethyl-3-cyclohexene-1,2-diacetate, 3-cyclohexene-1,1-dimethanol, 4-cyclopentene-1,3-diol, cyclohexene-4,5 dimethanol, 1-cyclopentene-1,2-dicarboxylic anhydride, a tetrahydrophthalic anhydride derived from a butadiene, 2,3-dimethyl-1,3-butadiene or isoprene, a cyclohexenyl diamine, and the like.

The monomer (b) used to form said condensation prepolymer ($P^A$) is a di- or polyfunctional (via group G) hydrocarbon compound. At least one or mixtures of materials may be used.

More specifically, the hydrocarbon based group R' can be substituted or unsubstituted, cyclic or non-cyclic, linear or branched, aliphatic, aromatic, or mixed aliphatic and aromatic including hydrocarbyl, hydrocarbylene, hydrocarbyloxy, hydrocarbylsilyl, hydrocarbylamino, and hydrocarbylsiloxy groups.

The R' group may have G functional groups bonded to the R' group at any position of the R' group. For example, each G functional group may be terminally bonded to the R' group or may be bonded to an internal carbon atom of the R' group. Further, there may be two G functional groups or a plurality of greater than two of said groups as, for example three or four of said functional groups bonded to an R' group.

Examples of monomer (b) include but are not limited to:
1) alicyclic or aliphatic diols, such as $C_2$-$C_{20}$ alkanediols as, for example, ethylene glycol, propanediol, $C_4$-$C_8$ alkanediols such as butanediol (all isomers) as, for example, 1,4-butanediol, pentanediol (all isomers), hexanediol (all isomers) as, for example, 1,6-hexanediol, and 1,8-octanediol, as well as 1,10-decanediol, 1,14-tetradecanediol, 1,4-cyclohexanediol, 1,4-cyclohexanedimethanol, polyethylene glycol and the like;
2) aromatic diols as, for example 1,3-benzenediol, 1,3-naphthanediol and the like;
3) polyols as, for example, 1,2,3-propanetriol, 1,3,5-pentanetriol, 1,5,8-heptanetriol, trimethylolpropane, neopentyl glycol and the like;
4) diamines as, for example, propylenediamine, butylenediamine, hexylenediamine and the like;
5) isocyanates, as, for example, toluenediisocyanate, hexamethylene diisocyanate and the like;
6) aliphatic or aromatic carboxylic acids or anhydrides, as, for example, trimellitic anhydride, pyromellitic dianhydride, benzophenone tetracarboxylic dianhydride, isophthalic acid, dimethyl isophthalate, terephthalic acid, dimethyl terephthalate, adipic acid, succinic acid and the like, or
7) mixtures of the above materials.

The term "hydrocarbon" moiety or group refers to the R' group of monomer (b) to which the linking groups G are directly attached. The hydrocarbon R group has a predominantly hydrocarbon character within the context of the present invention. The term "moiety" and "group" are used herein interchangeably. Such moieties include:
(1) Hydrocarbon groups; that is, aliphatic groups, aromatic groups and alicyclic groups, and the like, which may or may not be substituted, of the type known to those skilled in art.
(2) Substituted hydrocarbon groups; that is, groups containing pendent non-hydrocarbon substituents, that in the context of this invention, do not alter the predominantly hydrocarbon character of the group or interfere with the condensation polymerization and the oxygen scavenging properties of the resultant scavenger material in the contemplated application. Those skilled in the art will be aware of suitable substituents; examples are halo, nitro, silyl, siloxy, alkoxy, carbalkoxy, and alkythio.
(3) Hetero groups; that is, groups which, while predominantly hydrocarbon in character within the context of this invention, contain atoms other than carbon present as a member of the linear structure of a chain or ring otherwise composed of carbon atoms. Suitable heteroatoms will be apparent to those skilled in the art and include, for example, nitrogen, oxygen, silicon and sulfur.

In general, the hydrocarbon based group can be substituted or unsubstituted, cyclic or non-cyclic, linear or branched, aliphatic, aromatic, or mixed aliphatic and aromatic including hydrocarbyl, hydrocarbylene, hydrocarbyloxy, hydrocarbylsilyl, hydrocarbylamino, and hydrocarbylsiloxy groups.

The X and Y groups of the alicyclic compound, monomer (a), and the G groups of the polyfunctional compound, monomer (b), are selected from (i) hydroxyl groups or primary amino groups on the one hand, and (ii) carboxylic acid groups, carboxylic acid ester groups, acid halide groups, isocyanate groups or mixtures thereof on the other hand so as to provide a molar ratio of (i) to (ii) of about 1:1 such as from 0.9:1 to 1.1:1, and from 0.95:1 to 1.05:1 being appropriate to form a condensation polymer segment having polyester linkages, polyurethane linkages and/or polyamide linkages between residual monomeric units of (a) and (b). Either (i) or (ii) may be used in excess to assure that the resultant condensation prepolymer has groups (e.g. terminal groups) that are either reactive with the functional group of the Block B prepolymer contemplated for use, or capable of reacting with monomers which produce Block B segment, as described herein below.

The preparation of the subject condensation prepolymer ($P^A$) can be carried out using conventional processes for forming condensation polymerization polymer products. The monomers are contacted at elevated temperature (normally at temperatures of from 120° C. to 300° C., such as from 190° C. to 260° C.) with the elimination of water or other condensation by-product.

When monomer (a) described above has X and Y groups selected from carboxylic acid groups, alkyl carboxylic acid groups, their lower $C_1$-$C_3$ alkyl ester derivatives or X and Y groups together represent an acid anhydride, then monomer (b) described above has at least two G groups and each of said G groups is independently selected from hydroxyl group or primary amino group. It is beneficial that two of said G groups are at terminal (alpha, omega) positions of the monomer molecule and that excess G groups over two are pendent from any carbon atom of the R' hydrocarbyl group.

The above described prepolymer ($P^A$) should be composed of from 40 to 60 (such as from 45 to 55) molar percent of monomer (a); and from 60 to 40 (such as from 55 to 45) molar percent of monomer (b).

The present block co-polymer can be formed by combining the above described prepolymer ($P^A$) with the below described prepolymer ($P^B$) or reacting the above described prepolymer ($P^A$), which possesses suitable reactive groups (such as at terminal positions), with a monomer capable of reacting with said reactive groups to produce block B bonded covalently to the prepolymer ($P^A$), such as at the terminal positions of prepolymer ($P^A$).

Prepolymer B ($P^B$) is selected from mono-functional or di-functional polymers represented by the following:

$$P\text{-}(J)_p$$

wherein

P represents a polymer capable of forming a film and being thermoplastic at temperatures higher than room temperature; and J represents functional groups that are capable of being part of a heteroatom containing linkage forming a covalent bond linkage between the prepolymer A ($P^A$) and the prepolymer B ($P^B$), for example, said functional group can be selected from —OH, —$NH_2$, —N=C=O and —$(CH_2)_n$—C=O)-D with n being an integer in the range from 0 to 20 and D being selected from a halide atom or an OR group where R is an —H or $C_1$—$C_{12}$ alkyl group and p is 1 or 2. The exact nature of functional groups J will depend upon the identity of the residual functional groups of prepolymer ($P^A$)

The molecular weight of prepolymer B should be at least 1000, such as from 2000 to 100,000. The exact molecular weight of prepolymer B will depend on the molecular weight of prepolymer A, the identity of the diluent polymer, if any, used in conjunction with the subject block co-polymer, and the application contemplated for the resultant composition.

Prepolymer B ($P^B$) can have a high melting point while prepolymer A ($P^A$) has a low melting point.

The block co-polymers formed from the above described prepolymers can comprise from 20 to 80 weight percent of polymer segment (A) (such as from 30 to 70 weight percent) and from 80 to 20 weight percent of polymer segment (B) (such as from 70 to 30 weight percent).

The prepolymer $P^B$ has one or more functional group J bonded to the prepolymer $P^A$. The functional group is capable of being part of a heteroatom containing linkage forming a covalent bond linkage between the prepolymer A and the prepolymer B. The selection of functional group J will depend on the unreacted functional group(s) present with respect to prepolymer A. Alternately, functional group J may cause cleavage of prepolymer A through transesterification, transamidation or the like to provide the resultant block co-polymer. The J functional group may be selected from hydroxyl or amino groups when the unreacted groups of prepolymer A is a carboxylic acid, carboxylic acid ester, carboxylic acid halide or isocyano group. In the alternative, the J functional group may be selected from a carboxylic acid, carboxylic acid ester, carboxylic acid halide or isocyano group when the unreacted groups of prepolymer A is selected from hydroxyl or amino groups.

The prepolymer $P^B$ may be selected from polymers having the required melting point, the ability to form film material and the ability to exhibit functionality with respect to the residual functional groups of prepolymer A. In general, prepolymer B does not have oxygen scavenging functionality. Examples of prepolymer B include functionalized polyolefins such as, for example, hydroxyl terminated polyethylene, amino terminated polyethylene, carboxyl terminated polyethylene, hydroxyl terminated polypropylene, amino terminated polypropylene, carboxyl terminated polypropylene and the like; functionalized polystyrene such as, for example, hydroxyl terminated polystyrene, amino terminated polystyrene, carboxyl terminated polystyrene and the like; polyamides such as, for example, amino terminated polyamide, carboxyl terminated polyamide and the like, and polyesters.

Monofunctionalized polymers suitable for use as prepolymer B are commercially available and processes of forming same are well known. For example, functionalized polyolefins can be formed by hydrogenation of functionalized unsaturated polymers such as hydroxy-terminated polybutadiene or hydroxy-terminated polyisoprene. These functionalized unsaturated polymers are in turn prepared by the reaction of anionically-prepared polybutadiene or polyisoprene with ethylene oxide. Functionalized polystyrene can be formed by the quenching of living anionically prepared polystyrene with electrophiles such as ethylene oxide, to produce a hydroxyl-terminated functionalized polystyrene, or carbon dioxide, to produce a carboxylic acid-terminated functionalized polystyrene.

Functionalized polyamides having one or two functional groups such as carboxylic acid groups or amino groups can be formed by normal thermal condensation techniques employing an excess of dicarboxylic acid monomer or diamine monomer.

The block co-polymer may also be prepared by reacting a suitably terminated prepolymer (A) with monomers capable of polymerizing into a thermoplastic, film forming polymeric material. Monomers capable of being polymerized into thermoplastic, film forming polymeric materials include beta-propiolactone, beta-butyrolactone, gamma-valerolactone. 1,4-dioxane-2-one, 1,4-dithiane-2,5-dione, trimethylene carbonate, neopentylene carbonate, ethylene oxalate, epsilon-caprolactone, caprolactam, lactide and glycolide. Alternatively, mixtures of these monomers may be used in the preparation of the prepolymer (B) block.

These monomers will polymerize in the presence of an initiator, such as the hydroxyl functional group attached to prepolymer (A), and a catalyst for ring opening mechanism to provide a linear block copolymer. The catalyst used for the ring opening polymerization includes but is not limited to aluminum, zinc, tin, titanium, magnesium, vanadium and zirconium compounds, such as alkyls, oxides, carboxylates and alkoxides. The reaction of the suitably terminated prepolymer (A) with monomers capable of polymerizing into a thermoplastic, film forming polymeric material can be conducted at elevated temperatures, such as 70° C. and above. The actual temperature used will be determined by such parameters as melting point of the monomer capable of polymerizing into the thermoplastic polymer, the desired reaction rate and the degree of side reactions, such as transesterification that is desired.

It is one embodiment of the subject invention to form the present block co-polymer by utilizing a prepolymer A which is a polyester having hydroxyl terminal groups with caprolactone to provide ring opening and attachment of the caprolactone molecule to the functional groups of the prepolymer A.

The compositions of this invention produce significantly less oxidative by-products caused by the oxygen scavenging process than those described in the prior art, and they do not require the use of high levels of adjuncts to absorb these undesirable byproducts. Such absorbent additives are known in the art, for example see U.S. Pat. No. 5,834,079 and U.S. Pat. No. 08/857,276. It is also well known in the art that such additives (zeolites and silicas) adversely affect the haze and clarity of packaging films.

The composition of the present invention has been found to enhance the oxygen scavenging performance, especially the low temperature performance in comparison to compositions merely composed of $P^4$. This is especially true when caprolactone is used in the formation of the prepolymer (B) block segment of the subject copolymer. For example, ethylene glycol/tetrahydrophthalic anhydride condensation polymers that have a $T_g$ close to room temperature exhibit very low scavenging properties, especially at refrigeration temperatures. In contrast, when such condensation polymers are used to form block co-polymer with caprolactone according to the present invention, it was found to result in enhanced oxygen scavenging performance at both room temperature and refrigerated temperature conditions.

The compositions of this invention can be used in a wide range of packaging materials, and are not restricted to flexible packaging films and articles such as pouches produced from such films. The compositions may also be used in the preparation of rigid and semi-rigid packaging materials. Typical rigid and semi-rigid articles include plastic, paper or cardboard cartons, bottles such as juice containers, thermoformed trays, or cups with wall thickness of 100 to 2000 microns. The walls of such articles comprise single or multiple layers of materials. The compositions can be used as the sole polymeric material from which one or more layers of a film are formed (i.e., the film can be a multilayer film having, for example, a gas barrier layer, a sealant layer, etc.), it can be blended with other polymeric oxygen scavenging agents (such as polybutadiene, poly(ethylene/vinyl cyclohexene) or poly(ethylenemethylacrylate/cyclohexenylmethylacrylate copolymer (EMCM) or it can be blended with one or more diluent polymers which are known to be useful in the formation of packaging film materials and which often can render the resultant film more flexible and/or processable. Suitable diluent polymers include, but are not limited to, polyethylenes such as, for example, low-density polyethylene, very low-density polyethylene, ultra-low density polyethylene, high-density polyethylene, and linear low density polyethylene; polyesters such as, for example, polyethylene terephthalate (PET) or polyethylene naphthenate (PEN); polyvinyl chloride (PVC); polyvinylidene chloride (PVDC); polycaprolactone polymers and ethylene copolymers such as ethylene/vinyl acetate copolymers (EVA and VAE), ethylene/alkyl (meth)acrylate copolymers (EMA), ethylene/vinyl alcohol copolymers, ethylene/(meth)acrylic acid copolymers, ethylene/butyl acrylate (EBA) copolymers, ethylene/vinyl alcohol, ethylene/acrylic acid (EAA), and ionomers. Blends of different diluent polymers also can be used.

The compositions of this invention can also be used in non-integral packaging components such as coatings, sachets, bottle cap liners, adhesive and non adhesive sheet inserts, lamination adhesive, coupons, gaskets, sealants or fibrous mat inserts. Generally, the foregoing diluent polymers are semi-crystalline materials. Selection of a particular diluent polymer(s) depends largely on the article to be manufactured and the end use thereon. For instance, certain polymers are known by the ordinarily skilled artisan to provide clarity, cleanliness, barrier properties, mechanical properties, and/or texture to the resultant article.

In combination with the block co-polymer component, the oxygen scavenging composition of the present invention may include a transition metal salt, compound or complex, as an oxygen scavenger catalyst. The transition metal can be selected from the first, second, or third transition series of the Periodic Table. The metal can be Rh, Ru, or one of the elements in the series of Sc to Zn (i.e., Sc, Ti, V, Cr, Mn, Fe, Co, Ni, Cu, and Zn). Suitable anions for the salts include, but are not limited to, chloride, acetate, oleate, stearate, palmitate, 2-ethylhexanoate, neodecanoate, and naphthenate. Representative salts include cobalt (II) 2-ethylhexanoate, cobalt oleate, and cobalt (II) neodecanoate. (The metal salt also can be an ionomer, in which case a polymeric counter ion may be employed.)

When used in forming a packaging article, the oxygen scavenging composition of the present invention may include only the above-described polymers and a transition metal catalyst. However, photoinitiators can be added to further facilitate and control the initiation of oxygen scavenging properties. Adding a photoinitiator or a blend of photoinitiators to the oxygen scavenging composition can be beneficial where antioxidants have been added to prevent premature oxidation of the composition during processing and storage.

Suitable photoinitiators are known to those skilled in the art. See, e.g., PCT publication WO 97/07161, WO 97/44364, WO 98/51758, and WO 98/51759, the teachings of which are incorporated herein by reference in their entirety. Specific examples of suitable photoinitiators include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis (dimethylamino)-benzophenone, acetophenone and its derivatives, such as, o-methoxyacetophenone, 4'-methoxyacetophenone, valerophenone, hexanophenone, a-phenylbutyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones; alpha-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, benz[a] anthracene-7, 12-dione, 2,2-dimethoxy-2-phenylacetophenone, diethoxyacetophenone, dibutoxyacetophenone, 4-benzoyl-4'-methyl(diphenyl sulfide), 2,4,6-trimethylbenzoyldiphenylphosphine oxide, bis-(2,4,6-trimethylbenzoyl)phenylphosphine oxide (Irgacure 819), bis(2,6-dimethoxybenzoyl)-2,4,4-trimethylpentylphosphine oxide, and the like.

Single oxygen-generating photosensitizers such as Rose Bengal, methylene blue, and tetraphenylporphine as well as polymeric initiators such as poly(ethylene carbon monoxide) and oligo[2-hydroxy-2-methyl-1-[4-(1-methylvinyl)phenyl]propanone] also can be used. However, photoinitiators generally provide faster and more efficient initiation. When actinic radiation is used, photoinitiators also can provide initiation at longer wavelengths which are less costly to generate and present less harmful side effects than shorter wavelengths. When the diluent resins are PET or PEN and the like, photoinitiators that absorb at longer wavelengths in order to allow adequate triggering are beneficial.

When a photoinitiator is included, it can enhance and/or facilitate the initiation of oxygen scavenging by the composition of the present invention upon exposure to radiation. The amount of photoinitiator can depend on the amount and type of cyclic unsaturation present in the polymer, the wavelength and intensity of radiation used, the nature and amount of antioxidants used, and the type of photoinitiator used. The amount of photoinitiator also can depend on how the scavenging composition is used. For instance, if a photoinitiator-containing composition is in a film layer, which is underneath another layer that is somewhat opaque to the radiation used, more initiator might be needed. However, the amount of photoinitiator used for most applications ranges from 0.01 to 10% (by wt.) of the total composition. Oxygen scavenging can be initiated by exposing an article containing the composition of the present invention to actinic or electron beam radiation, as described below.

One or more known antioxidants can be incorporated into the scavenging composition of the present invention to retard degradation of the components during compounding and film formation. Although such additives prolong the induction period for oxygen scavenging activity to occur in the absence of irradiation, the layer or article (and any incorporated photoinitiator) can be exposed to radiation at the time oxygen scavenging properties are required. Suitable antioxidants include but are not limited to 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, vitamin E (alpha-tocopherol), octadecyl-3,5,-di-tert-butyl-4-hydroxyhydrocinnamate, tetrakis[methylene (3,5-di-tert-butyl-4-hydroxyhydrocinnamate)]methane, tetrakis(2,4-di-tert-butylphenyl)-4,4'-biphenyldiphosphonite and the like.

When an antioxidant is included as part of the composition of the present invention, it can be present in an amount which prevents oxidation of the components of the oxygen scavenging composition as well as other materials present in a resultant blend during formation and processing; however, the amount is beneficially less than that which interferes with the scavenging activity of the resultant layer, film, or article after initiation has occurred. The amount needed in a given composition can depend on the components present therein, the particular antioxidant used, the degree and amount of thermal processing used to form the shaped article, and the dosage and wavelength of radiation applied to initiate oxygen scavenging. Typically, such antioxidant(s) are used in an amount of from 0.01 to 1% (by wt.).

Other additives that also can be included in the oxygen scavenging composition of the present invention include, but are not necessarily limited to, fillers, pigments, dyestuffs, processing aids, plasticizers, antifog agents, antiblocking agents, and the like.

The amounts of the components used in the oxygen scavenging composition of the present invention can affect the use and effectiveness of this composition. Thus, the amounts of polymer, transition metal catalyst, and any photoinitiator, antioxidant, polymeric diluents, additives, etc., can vary depending on the desired article and its end use. For example, one of the primary functions of the polymer described above is to react irreversibly with oxygen during the scavenging process, while a primary function of the transition metal catalyst is to facilitate this process. Thus, to a large extent, the amount of polymer present affects the oxygen scavenging capacity of the composition, i.e., the amount of oxygen that the composition can consume, while the amount of transition metal catalyst affects the rate at which oxygen is consumed as well as the induction period.

The composition of the present invention can provide oxygen scavenging properties at a desirable rate and capacity while having good processing and compatibility properties. Thus, the present composition can be used to provide, by itself or as a blend with diluent film-forming polymers, such as polyolefins and the like, a packaging material that can be manufactured and processed easily. Further, the subject oxygen scavenging composition will deplete the oxygen within a package cavity without substantially detracting from the color, taste, and/or odor of the product contained therein. In addition, compositions formed with the present oxygen scavenger polymer product have enhanced processability both in its formation as a film material and in its handling and processing to form a package article. Finally, the present oxygen scavenger block copolymer composition has been found to provide enhanced scavenger properties when used at ambient temperature and at refrigeration temperature conditions.

The amount of the polymeric scavenging component contained in the subject composition needs to be determined based on the end use of the article and can range from 1 to 100%, such as from 5 to 97.5%, from 10 to 95%, from 15 to 92.5%, and from 20 to 90%, (with all of the foregoing percentages being by weight) of the composition or layer made therefrom. Incorporation of low levels of the subject polymeric scavenger, e.g., 1-20% by weight, can be used for active barrier applications to prevent oxygen ingress into the container. Higher levels of the subject polymeric scavenger, e.g., 21-100% by wt. can be used for headspace oxygen scavenging applications where large quantities of oxygen need to be removed from the package.

Typically, the amount of transition metal catalyst can range from 0.001 to 1% (by wt.) of the scavenging composition, based on the metal content only (i.e., excluding ligands, counter ions, etc.). Where one or more other scavenging compounds and/or diluent polymers are used as part of the composition, such other materials can make up as much as 99%, such as up to 75%, by weight of the scavenging composition. Any further additives employed normally do not make up more than 10%, such as no more than 5%, by weight of the scavenging composition. As indicated above, the composition of the present invention can be used to produce a scavenging monolayer film, a scavenging layer of a multilayer film, or other articles for a variety of packaging applications. Single layer articles can be prepared readily by extrusion processing and provide a product having low tack properties. Such properties, as discussed above provide enhanced processability in formation of a defect free film and the like packaging article and, further, in processing as part of the finished packaging article. Multilayer films typically are prepared using coextrusion, coating, lamination or extrusion/lamination as taught in, for example, U.S. Pat. Nos. 5,350,622 and 5,529,833, the teachings of which are incorporated herein by reference in their entirety.

At least one of the additional layers of a multilayer article can include a barrier type material having a permeance to oxygen of no more than $5.8 \times 10^{-8}$ cm$^3$/m$^2$-s-Pa (i.e., 500 cm$^3$/m$^2$-24 hours-atm), such as no more than $1.06 \times 10^{-8}$ cm$^3$/m$^2$-s-Pa (i.e., 100 cm$^3$/m$^2$-24 hours-atm), such as no more than $0.58 \times 10^{-8}$ cm$^3$/m$^2$-s-Pa (i.e., 50 cm$^3$/m$^2$-24 hours-atm) at 25° C. Polymers which are commonly used in such oxygen barrier layers include poly(ethylene/vinyl alcohol) (EVOH), poly(vinyl alcohol) (PVOH), polyacrylonitrile (PAN), polyvinyl chloride (PVC), poly(vinylidene dichloride) (PVDC), polyethylene terephthalate (PET), silica (SiO$_x$), and polyamides, such as polycaprolactam (nylon 6), metaxylylene adipamide (MXD6), hexamethylene adipamide (nylon 66), as well as various amide copolymers. (Metal foil layers can also provide oxygen barrier properties.) Other additional layers can include one or more layers which are permeable to oxygen. In one embodiment, such as flexible packages for food, the layers can include (in order starting from the outside of the package to the innermost layer of the package) (a) an oxygen barrier layer, (b) a scavenging layer, i.e. one that includes the scavenging composition described above, and optionally, (c) an oxygen permeable layer. Control of the oxygen barrier property of layer (a) provides a means to regulate the scavenging life of the package by limiting the rate of oxygen entry to the scavenging layer (b), thus limiting the rate of consumption of scavenging capacity. Control of the oxygen permeability of layer (c) provides a means to set an upper limit on the rate of oxygen scavenging for the overall structure independent of the composition of scavenging layer (b). This can serve the purpose of extending the handling lifetime of the film in the presence of air prior to sealing of the package. Furthermore, layer (c) can provide a barrier to migration of the individual components or byproducts of the scavenging layer into the package interior. The term "exposed to the interior" refers to a portion of a packaging article having the subject scavenging composition which is either directly exposed or indirectly exposed (via layers which are O$_2$ permeable) to the interior cavity having oxygen sensitive product, Even further, layer (c) also can improve the heat sealability, clarity, and/or resistance to blocking of the multilayer film. Further additional layers such as tie layers, easy open layers, and seal layers can also be used. Polymers typically used in such tie layers include, for example, anhydride functional polyolefins.

The method of the present invention includes exposing the above-described composition to a package cavity having an oxygen sensitive product therein. One embodiment provides for including antioxidants and a photoinitiator as part of the subject composition and subjecting a film, layer, or article that includes such a composition to radiation so as to initiate oxygen scavenging on demand at desired rates. In this embodiment the thermal radiation used in heating and processing the polymers typically used in packaging films (e.g., 100-250° C.) advantageously does not trigger the oxygen scavenging reaction. However, there may exist applications in which triggering is not possible or desired. Therefore, if low amounts of antioxidant are used in the polymer formulation in conjunction with the catalyst it is possible to prepare a composition, which would become actively oxygen scavenging upon extrusion. These materials would need to be used immediately or in some way protected from oxygen during storage.

The initiating radiation is actinic, e.g., UV or visible light having a wavelength of from 200 to 750 nm, such as of from 200 to 600 nm, and from 200 to 400 nm. Such light can be delivered in a continuous or pulsed manner. The layer, film, etc., containing the oxygen scavenging composition can be exposed to such radiation until it receives at least 1 J/g of radiation, e.g. until it receives a dose in the range of 10 to 2000 J/g. The radiation also can be electron-beam radiation at a dosage of at least 2 kiloGray (kGy), such as from 10 to 100 kGy. Other potential sources of radiation include ionizing radiation such as gamma, X-ray, and corona discharge. Duration of exposure depends on several factors including, but not limited to, the amount and type of photoinitiator present, thickness of the layers to be exposed, thickness and opacity of intervening layers, amount of any antioxidant present, and the wavelength and intensity of the radiation source.

When using oxygen scavenging layers or articles, irradiation can occur during or after the layer or article is prepared. If the resulting layer or article is to be used to package an oxygen sensitive product, exposure can be just prior to, during, or after packaging. For best uniformity of irradiation, exposure occurs at a processing stage where the layer or article is in the form of a flat sheet. For further information on initiation via irradiation, the reader is directed to PCT publications WO 98/05555 and WO 98/05703, as well as PCT 97/13598, 97/13370, 97/13369, the teachings of which are incorporated herein by reference.

Determining the oxygen scavenging rate and capacity of a given oxygen scavenging composition contemplated for a particular use can be beneficial. To determine the rate, the time elapsed before the scavenger depletes a certain amount of oxygen from a sealed container is measured. In some instances the rate can be determined adequately by placing a film containing the desired scavenging composition in an air-tight, sealed container of an oxygen containing atmosphere, e.g., air which typically contains 20.6% (by vol.) O$_2$ or some other quantity such as 1% (by vol.) O$_2$. Over time, samples of the atmosphere inside the container are removed to determine the percentage of oxygen remaining. (Usually, the specific rates obtained vary under different temperature and atmospheric conditions. Atmospheres having lower initial oxygen content and/or maintained under low temperature conditions provide a more stringent test of the scavenging ability and rate of a composition. The rates which follow are at room temperature and one atmosphere of air, unless otherwise specified.) When an active oxygen barrier is needed, a useful scavenging rate can be as low as 0.05 cm$^3$ oxygen per gram of the polymer in the scavenging composition per day in air at 25° C. and at 1 atm (101.3 kPa). However, in most instances, the present composition has a rate equal to or greater than $5.8 \times 10^{-6}$ cm$^3$/g·S (0.5 cm$^3$/g day), even up to or greater than $5.8 \times 10^{-5}$ cm$^3$/g·S (5 cm$^3$/g day). Further, films or layers including the subject composition are capable of a scavenging rate greater than $1.2 \times 10^{-314}$ cm$^3$/m$^2$·S (10 cm$^3$/m$^2$ day), and under some conditions, greater than $2.9 \times 10^{-4}$ cm$^3$/m$^2$·S (25 cm$^3$/m$^2$ day). (Generally, films or layers deemed suitable for use as an active oxygen barrier can have a scavenging rate as low as $1.2 \times 10^{-5}$ cm$^3$/m$^2$·S (1 cm$^3$/m$^2$ day) when measured in air at 25° C. and 101 kPa (1 atm). Scavenging rates suitable for refrigeration temperature conditions are attained with the present composition. Such rates make those layers suitable for scavenging oxygen from within a package, as well as suitable for active oxygen barrier applications.

When the method of the present invention is to be used in an active oxygen barrier application, the initiated oxygen scavenging activity, in combination with any oxygen barriers, can create an overall oxygen permeance of less than $1.1 \times 10^{-10}$ cm$^3$/m$^2$ s·Pa (1.0 cm$^3$/m$^2$ day atm) at 25° C. The oxygen scavenging capacity preferably is such that this value is not exceeded for at least two days.

Once scavenging has been initiated, the scavenging composition, layer, or article prepared therefrom preferably is able to scavenge up to its capacity, i.e., the amount of oxygen which the scavenger is capable of consuming before it becomes ineffective. In actual use, the capacity required for a given application can depend on the quantity of oxygen initially present in the package, the rate of oxygen entry into the package in the absence of the scavenging property, and the intended shelf life for the package. When using scavengers that include the composition of the present invention, the capacity can be as low as 1 cm$^3$/g, but can be 50 cm$^3$/g or higher. When such scavengers are in a layer of a film, the layer has an oxygen capacity of at least 4.9 cm$^3$/m$^2$ per μm thickness (125 cm$^3$/m$^2$ per mil), such as at least 11.5 cm$^3$/m$^2$ per μm thickness (300 cm$^3$/m$^2$ per mil).

The composition of the present invention has been found to be capable of providing a film, layer or article which substantially retains its physical properties (e.g., tensile strength and modulus) even after substantial oxygen scavenging has occurred. In addition, the present composition does not provide significant amounts of by-products and/or effluents, which can impart an undesired taste, color, and/or odor to the packaged product.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLE 1 cis-1,2,3,6-Tetrahydrophthalic
Anhydride/1,6-Hexanediol Condensation
Prepolymer (P$^A$)

A 500 ml round bottom flask, (RBF), equipped with a stirrer, thermocouple, nitrogen inlet and a distillation head was charged with 156.6 g of 1,6-hexanediol (HD), 200 g of tetrahydrophthalic anhydride (THPA), 0.1400 g of trimethylolpropane (TMOP) and 0.09 g of titanium butoxide. This is a 1.008 mole ratio of diol to anhydride. The reaction mixture was heated with distillation at 210° C. for one hour, then the temperature was increased to 230° C. and heated for one hour. During this time 24 g of distillate was collected. The distillate was predominantly water, but also contained some 1,6-hexanediol.

In the second step, 0.09 g of additional titanium butoxide was added and the reaction mixture was heated to 230° C. under vacuum (0.2-0.8 mm) and held for three hours. The resulting polymer was cooled to room temperature.

GPC analysis showed the polymer had a $M_n$ of 11,364, a $M_w$ of 46,155, and a ratio of $M_w/M_n$ of 4.06. The hydroxyl value was 4.9 meq./g and the acid number was 0.3 meq/g. The polymer was a soft, sticky, solid material. It exhibited cold flow properties and could not be pelletized. Analysis by Differential Scanning Calorimetry (DSC) showed the polymer had a $T_g$ of −39.6° C.

EXAMPLE 2 cis-1,2,3,6-Tetrahydrophthalic anhydride/Ethylene
Glycol Condensation Prepolymer (P$^A$)

Using the procedure described above for Example 1, an ethylene glycol/tetrahydrophthalic anhydride polyester resin was prepared starting with a 1.01 mole ratio of diol to anhydride. The resultant polyester resin had a $M_n$ of 8,510 and a $T_g$ of 15° C. The resultant polymer was a glassy, crystalline, solid material.

EXAMPLE 3

Polyethylene Block Copolymer using Polyethylene
Monoalcohol

To 60 g of the Polyester prepared in Example 1 was added 12 g of polyethylene monoalcohol (Aldrich Catalog number 44,447-2, $M_n$=4600), and 200 ppm of titanium butoxide. The reaction mixture was heated under vacuum at 230° C. for 30 minutes. GPC analysis of the resulting polymer showed a $M_n$ of 5,129, a $M_w$ of 10,665 and a ratio of $M_w/M_n$ of 2.08. The polymer material was a waxy solid. DSC analysis showed that the polymer had a $T_g$ of −39.5° C.

EXAMPLE 4

Block Co-Polymer using
Poly(ethylene-co-1,2-butylene)diol

To 60 g of polyester prepared in Example 1 was added 2.7 g of poly(ethylene-co-1,2-butylene)diol (Aldrich Catalog number 46,833-9, $M_n$=2500), and 200 ppm of titanium butoxide. The reaction mixture was heated under vacuum at 250° C.

EXAMPLE 5

Hexanediol/Tetrahydrophthalic anhydride
Polyester-Caprolactone Block Copolymer

Thirty grams of a hexanediol/tetrahydrophthalic anhydride polyester, prepared according to the general synthesis procedure described in Example 1 from 856 grams of 1,6-hexanediol and 1,080 grams of cis-1,2,3,6-tetrahydrophthalic anhydride and having a hydroxyl value (OH) of 6.3, an acid number (AN) of 0.3, and a $M_n$ of 12,071, was added to a 100 ml glass flask equipped with an overhead stirrer, an Argon gas purge and a thermocouple. Thirty grams of vacuum distilled caprolactone (CP) was added and gentle heating and stirring was applied until the mixture had become homogeneous. The mixture was then heated to 110° C. and three drops (0.08 grams) of tin II (2-ethylhexanoate) was added. The mixture was stirred for six hours and then discharged onto a TEFLON™-coated aluminum sheet. The polymer quickly solidified into a non-tacky solid. Analytical results are shown in Table 1.

EXAMPLE 6

Hexanediol/Tetrahydrophthalic Anhydride
Polyester-Caprolactone Block Copolymer

Thirty grams of a hexanediol/tetrahydrophthalic anhydride polyester, prepared using the general synthesis procedure of Example I from 856 grams of hexanediol and 1,080 grams of tetrahydrophthalic anhydride and having a hydroxyl value of 6.3, an acid number of 0.3, and a $M_n$ of 12,071, was added to a 100 ml glass flask equipped with an overhead stirrer, an Argon gas purge and a thermocouple. This polyester was slowly heated to 85° C. with stirring and fifteen grams of distilled caprolactone was added over ten minutes. The resulting mixture was stirred for thirty minutes at 95° C. The temperature was raised to 10° C. and two drops tin (II) 2-ethylhexanoate added. After five hours and fifteen minutes, the reaction mixture was discharged onto a TEFLON™-coated aluminum sheet. The polymer slowly solidified into a tough solid material. Analytical results are shown in Table 1.

EXAMPLE 7

1,10-Decanediol/Tetrahydrophthalic Anhydride
Polyester-Caprolactone Block Copolymer Thirty grams of a 1,10-decanediol/tetrahydrophthalic anhydride polyester, prepared using the general synthesis procedure described in Example 1 from 92.37 grams of 1,10-decanediol, 0.056 grams of trimethylolpropane, and 80 grams of tetrahydrophthalic anhydride and having a hydroxyl value of 12.8 and a $M_n$ of 8,825, was added to a 100 ml glass flask equipped with an overhead stirrer, an Argon gas purge and a thermocouple. The polyester was slowly heated to 85° C. with stirring. Fifteen grams of distilled caprolactone was then added over ten minutes and the mixture stirred for an additional 25 minutes. The temperature was then raised to 110° C. and three drops (0.08 grams) of tin (II) 2-ethylhexanoate added. The reaction mixture was stirred at 110C for six and one-half hours at which time the tacky product was discharged onto a TEFLON™-coated aluminum sheet. The polymer solidified into a hazy, taffy-like material. Analytical results are shown in Table 1.

EXAMPLE 8

Hexanediol/Tetrahydrophthalic Anhydride
Polyester-Caprolactone Block Copolymer

Thirty grams of a hexanediol/tetrahydrophthalic anhydride polyester, prepared using the general synthesis procedure in Example 1 from 1566 grams of hexanediol, 1.41 grams of trimethylolpropane, and 2000 grams of tetrahydrophthalic anhydride and having a hydroxyl value of 10.7, an acid number of 0.4, and a $M_n$ of 10,800, was added to a 100 ml glass flask equipped with an overhead stirrer, an Argon gas purge and a thermocouple. This polyester was slowly heated to 85° C. with stirring and fifteen grams of distilled caprolactone was added over ten minutes. The temperature was raised to 110° C. and three drops tin (II) 2-ethylhexanoate added. After five hours an additional three drops of catalyst was added and the mixture heated for an additional six hours. The polymer was discharged onto a TEFLON™ coated aluminum sheet. Analytical results are shown in Table 1.

EXAMPLE 9

Hexanediol/Tetrahydrophthalic Anhydride
Polyester-Caprolactone Block Copolymer

Thirty grams of a hexanediol/tetrahydrophthalic anhydride polyester, prepared using the procedure of Example 8 from 1566 grams of hexanediol, 1.41 grams of trimethylolpropane, and 2000 grams of tetrahydrophthalic anhydride and having a hydroxyl value of 10.7, an acid number of 0.4, and a $M_n$ of 10,800, was added to a 100 ml glass flask equipped with an overhead stirrer, an Argon gas purge and a thermocouple. This polyester was slowly heated to 85° C. with stirring and thirty grams of distilled caprolactone was added over ten minutes. The temperature was raised to 110° C. and five drops tin (II) 2-ethylhexanoate added. After five hours and forty five minutes, the polymer was discharged onto a TEFLON™ coated aluminum sheet. Analytical results are shown in Table 1.

EXAMPLE 10

Hexanediol/Tetrahydrophthalic Anhydride
Polyester-Caprolactone Block Copolymer

One thousand, five hundred grams of a hexanediol/tetrahydrophthalic anhydride polyester prepared using the procedure of Example 8 from 1608 grams hexanediol, 1.45 grams trimethylolpropane, and 2053.8 grams tetrahydrophthalic anhydride and having a hydroxyl value of 6.9 and a $M_n$ of 12,820, was charged into a eight liter Helicone mixer and heated to 85° C. with stirring. Fifteen hundred grams of caprolactone was added and the set temperature was raised to 112° C. After 30 minutes 5.0 grams of tin (II) 2-ethylhexanoate was added and the mixture stirred at 110° C. for five hours. The resultant polymer was discharged into a one-gallon plastic pail and allowed to cool. The polymer solidified after two days. Analytical results are shown in Table 1.

--- for 20 minutes. GPC analysis of the resulting polymer showed a $M_n$ of 12,349, a $M_w$ of 63,987 and a ratio of $M_w/M_n$ of 5.18. The polymer material was a hazy, waxy solid. DSC analysis showed that the polymer had a $T_g$ of −42° C.

TABLE 1

Properties of Hexanediol/Tetrahydrophthalic Anhydride Polyester - Polycaprolactone Block Copolymers

| Example | Composition | Starting Polyester Prepolymer (A) | | | Wt CP (g) | Wt Cat (g) | Block Co-Polymer Product | |
|---|---|---|---|---|---|---|---|---|
| | | Mn | OH | AN | Wt (g) | | | Mn | Tm (° C.) |
| 5 | HD/THPA | 12,070 | 6.3 | 0.3 | 30 | 30 | 0.08 | 41,560 | 44.0 |
| 6 | HD/THPA | 12,070 | 6.3 | 0.3 | 30 | 15 | 0.06 | 14,000 | 39.0 |
| 7 | DD/TMOP/THPA | 8,825 | 12.8 | — | 30 | 15 | 0.08 | 17,340 | 33.7 |
| 8 | HD/TMOP/THPA | 12,820 | 6.9 | 0.11 | 1,500 | 1,500 | 5.0 | 51,320 | 43.0 |
| 9 | HD/TMOP/THPA | 10,800 | 10.7 | 0.4 | 30 | 15 | 0.16 | 22,080 | 35.0 |
| 10 | HD/TMOP/THPA | 10,800 | 10.7 | 0.4 | 30 | 30 | 0.14 | 27,220 | 41.0 |

EXAMPLES 11-14

Varying Amounts of Caprolactone Hexanediol/Tetrahydrophthalic Anhydride Polyester-Caprolactone Block Copolymer A series of block copolymers consisting of hexanediol/tetrahydrophthalic anhydride polyester, prepared using the above Example 1 procedure from 2568 grams of hexanediol and 3240 grams tetrahydrophthalic anhydride and having a hydroxyl value of 7.7 and a $M_n$ of 7,200, and polycaprolactone were prepared using various amounts of distilled caprolactone monomer. The results are shown in Table 2.

TABLE 2

Varying Caprolactone Content on Block Copolymer Properties.

| Example # | Wt. CP | Product | | |
|---|---|---|---|---|
| | | Mn | Tm | H (J/g) |
| 11 | 10 | 8595 | 23.0 | 14.65 |
| 12 | 15 | 9920 | 38.0 | 26.18 |
| 13 | 20 | 19,800 | 38.4 | 28.66 |
| 14 | 30 | 24,420 | 40.7 | 37.09 |

EXAMPLES 15-17

Varying Catalyst Amount Hexanediol/Tetrahydrophthalic Anhydride Polyester-Caprolactone Block Copolymer Synthesis Thirty grams of a hexanediol/tetrahydrophthalic anhydride polyester, prepared using the above Example 1 procedure from 2568 grams of hexanediol and 3240 grams tetrahydrophthalic anhydride and having a hydroxyl value of 7.7 and a $M_n$ of 7,200, was reacted with thirty grams of distilled caprolactone for 7 hours using 0.16 grams, 0.08 grams and 0.04 grams of tin (II) 2-ethylhexanoate catalyst. The results are shown in Table 3.

TABLE 3

Effect of Amount of Catalyst on Block Copolymer Properties.

| Example # | Cat. Wt gram | Product | | |
|---|---|---|---|---|
| | | Mn | Tm | H (J/g) |
| 15 | 0.16 | 22,860 | 44.0 | 39.26 |
| 16 | 0.09 | 23,490 | 43.7 | 36.73 |
| 17 | 0.04 | 21,360 | 36.0 | 29.33 |

EXAMPLE 18

Hexanediol/Tetrahydrophthalic Anhydride Polyester-Polylactic Acid Block Copolymer Thirty grams of a hexanediol/tetrahydrophthalic anhydride polyester, prepared using the above Example 1 procedure from 2568 grams of hexanediol and 3240 grams tetrahydrophthalic anhydride and having a hydroxyl value of 7.7 and a $M_n$ of 7,200, was added to a 100 ml glass flask equipped with an overhead stirrer, an Argon gas purge and a thermocouple. This polyester was slowly heated to 85° C. with stirring and four drops tin (II) 2-ethylhexanoate added. The temperature was increased to 100° C. and 15 grams of (3S)-cis-3,6-dimethyl-1,4-dioxane-2,5-dione was added. The temperature was increased to 110° C. and the mixture stirred for seven hours. The reaction mixture was then discharged onto a TEFLON™-coated aluminum sheet and allowed to cool to room temperature. Analytical results are shown in Table 4.

EXAMPLE 19

Hexanediol/Tetrahydrophthalic Anhydride Polyester-Polylactic Acid Block Copolymer Thirty grams of a hexanediol/tetrahydrophthalic anhydride polyester, prepared using the above Example 1 procedure from 2568 grams of hexanediol and 3240 grams tetrahydrophthalic anhydride and having a hydroxyl value of 7.7 and a $M_n$ of 7,200, and thirty grams of (3S)-cis-3,6-dimethyl-1,4-dioxane-2,5-dione were added to a 100 ml glass flask equipped with an overhead stirrer, an Argon gas purge and a thermocouple. This mixture was slowly heated to 95° C. with stirring and four drops tin (II) 2-ethylhexanoate added. The temperature was increased to 110° C. and the mixture stirred for seven hours. The reaction mixture was then discharged onto a TEFLON™-coated aluminum sheet and allowed to cool to room temperature. Analytical results are shown in Table 4.

0.37 g cobalt neodecanoate (CO TENCEM™, OMG Inc., 22.5% Co). After mixing well the material was poured out onto a TEFLON™ sheet and allowed to cool to room temperature. The sheet was cut into approximate 1 inch squares and pressed into film between TEFLON™ sheets using a Carver press at its lowest temperature setting of 140° C.

TABLE 4

Properties of Hexanediol/Tetrahydrophthalic Anhydride Polyester-Polylactic Acid Block Copolymers.

| | Starting Polyester Prepolymer (A) | | | | Wt | Wt | Product | |
|---|---|---|---|---|---|---|---|---|
| Example | Composition | Mn | OH # | AN | Wt Lactide | Cat | Mn | Tm ° C. |
| 18 | HD/THPA | 7,200 | 7.7 | 1.7 | 30    15 | 0.12 | 17,420 | 120.0 |
| 19 | HD/THPA | 7,200 | 7.7 | 1.7 | 30    30 | 0.12 | 22,515 | 129.7 |

EXAMPLE 20

Oxygen Scavenging Analysis of Polyethylene-based Block Copolymers

The oxygen scavenging properties of Examples 1, 3 and 4 were tested by first separately blending each formed material with a commercial polyethylene carrier resin in a 30:70 ratio. Each of the blends was formed into a film for testing.

The tests were conducted by placing 25 g of polyester material to be tested into a 12 ounce glass jar with 3000 ppm (0.075 g) of PEPQ™ (tetrakis(2,4-di-tert-butylphenyl)-4,4'-biphenyldiphosphonite), and 500 ppm (0.0125 g) of E-201, (Vitamin E). The mixture was heated to melting in a 180° C. oil bath. In a second jar was placed a commercially available polyethylene (35,000 molecular weight polyethylene: Aldrich 42,779-9) which was also heated to melting in the oil bath. When both materials melted, 58.3 g of the melted polyethylene was added to the jar of melted polyester and the two materials were vigorously stirred together. This gave 30% polyester and 70% polyethylene by weight composition. To this mixture was added 1000 ppm (0.08 g) 4,4-Dimethylbenzophenone (Lancaster Synthesis) and 1000 ppm of cobalt i.e., The pressed monolayer scavenging film was cut into a 10 cm×10 cm piece, exposed to UV-C radiation for 90 seconds using a Anderson-Vreeland exposure unit. The film was then placed into a 16 cm×24 cm pouch prepared from a commerial barrier film (Cryovac P640B™) and heat-sealed under vacuum. 300 cc of air or 1% $O_2$ in $N_2$ was then introduced via septa. The oxygen content of each pouch was measured at regular intervals thereafter by withdrawing 8 cc samples of the atmosphere in the pouch via gas tight syringe and injecting the retrieved sample into a MOCON® Model PAC-CHECK™ 650. Samples were stored at either room temperature conditions or in a refrigerator at 4° C. Samples were also tested without irradiation to measure storage stability and all samples were found to be stable during the test period. Data is reported in Table 5.

TABLE 5

Oxygen Scavenging Analysis of Polyethylene-Based Block Copolymers.

| | | Oxygen Scavenging | |
|---|---|---|---|
| Example | Test Conditions | 4 Day Rate (cc/m² · day) | Capacity 7 Days (cc $O_2$/g) |
| Example 1, 1,6-Hexanediol/THPA Polyester | RA/RT | 349.6 | 125.2 |
| Example 1, 1,6-Hexanediol/THPA Polyester | RA/REF. | 109.3 | 54.3 |
| Example 1, 1,6-Hexanediol/THPA Polyester | 1% $O_2$/RT | 32.2 | 10 |
| Example 1, 1,6-Hexanediol/THPA Polyester | 1% $O_2$/REF. | 27.7 | 8.2 |
| Example 3 Polyethylene monoalcohol Block Co-polymer | 1% $O_2$/RT | 31.7 | 8.9 |
| Example 3 Polyethylene monoalcohol Block Co-polymer | 1% $O_2$/REF. | 26.5 | 8.6 |
| Example 4 of Poly(ethylene-co-1,2-butylene)diol Block Co-polymer | 1% $O_2$/RT | 32.3 | 8.3 |
| Example 4 of Poly(ethylene-co-1,2-butylene)diol Block Co-polymer | 1% $O_2$/REF. | 28.7 | 8.8 |

EXAMPLE 21

Oxygen Scavenging Testing of Caprolactone and Lactide-Based Block Copolymers A 50 ml resin kettle bottom was placed into a heating mantle and a thermocouple wire inserted between the heating mantle and glass. The heating mantle was heated until the temperature had reached the set point of 142° C. Twelve grams of caprolactone or lactide block copolymer, 0.006 gram of IRGANOX™ E201, and 0.036 gram of tetrakis(2,4-di-tert-butylphenyl)-4,4'-biphenyldiphosphonite were added and mixed until the stabilizers had been incorporated. Twenty-eight grams of polyethylene (density of 0.906, $M_w$~35,000, $M_n$~7,700 from Aldrich Chemical Company) was then added and mixed until melted and blended into the polyester, approximately 10 minutes. Dimethylbenzophenone (0.04 gram) and TENCEM™ (0.19 gram) was then added and mixed for five minutes. The formulation was then discharged onto a TEFLON™-coated aluminum sheet and allowed to cool to room temperature.

The formulated resins were then pressed into thin films between TEFLON™ films using a Carver press set at its lowest temperature setting of "1". The film was then exposed to UV-C radiation for 90 seconds on the Anderson-Vreeland exposure unit and then placed in a 16cm×24 cm pouch prepared from Cryovac P640B™ barrier film and heat-sealed under vacuum. 300 cc of air was then introduced via septa. The oxygen content of each pouch is measured at regular intervals thereafter by withdrawing 8 cc samples of the atmosphere in the pouches via gas tight syringe and injecting into a MOCON® Model PACCHECK™ 650. Samples are stored at either room temperature conditions or in a refrigerator at 4° C. The results are shown in Table 6.

oxygen scavenging performance of this polymer and Example A2 were tested using the procedure in Example 21. The Example A2 sample, comprised of ethylene glycol/tetrahydrophthalic anhydride having a glass transition temperature close to room temperature, had a comparatively low day seven rate of 29.8 cc/m2.day and day seven capacity of 34.1 cc $O_2$/g while the block copolymer had a day four rate of 201.2 cc/m2.day and a day four capacity of 128 cc $O_2$/g. This demonstrated that the presence of the polycaprolactone block not only resulted in a more solid, easily processable material but also improved the oxygen scavenging performance of block copolymers where the oxygen scavenging block is comprised of high glass transition temperature materials with poor scavenging performance at room temperature.

EXAMPLES 23-37

Block Copolymers of Ethylene Glycol/Tetrahydrophthalic Anhydride with PET Prepared via Reactive Extrusion A series of ethylene glycol/tetrahydrophthalic anhydride/PET block copolymers was prepared via reaction of bottle grade PET (polyethylene terephthalate) polyester, Eastman

TABLE 6

Oxygen Scavenging Analysis of the Block Copolymers

| Example # | Test Conditions | Oxygen Scavenging 4 Day Rate (cc/m² · day) | Capacity 14 Days (cc O₂/g) |
|---|---|---|---|
| 5 (50% 1,6 Hexanediol/THPA - 50% PCL) | RA/REF. | 138.9 | 55.6 |
| 5 (50% 1,6 Hexanediol/THPA - 50% PCL) | RA/RT. | 251.7 | 84.6 |
| 6 (67% 1,6 Hexanediol/THPA - 33% PCL) | RA/REF. | 76.0 | 16.5 |
| 6 (67% 1,6 Hexanediol/THPA - 33% PCL) | RA/RT. | 313.2 | 73.5 |
| 7 (67% 1,6 Decanediol/THPA - 33% PCL) | RA/REF. | 124.9 | 34.5 |
| 7 (67% 1,6 Decanediol/THPA - 33% PCL) | RA/RT. | 191.3 | 43.7 |
| 8 (50% 1,6 Hexanediol/THPA - 50% PCL) | RA/RT | 398 | 127.4 |
| 8 (50% 1,6 Hexanediol/THPA - 50% PCL) | RA/REF. | 196 | 72 |
| 14 (50% 1,6 Hexanediol/THPA - 50% PCL) | RA/RT | 482 | 120.7 |
| 14 (50% 1,6 Hexanediol/THPA - 50% PCL) | RA/REF. | 184 | 75.3 |
| 13 (60% 1,6 Hexanediol/THPA - 40% PCL) | RA/RT. | 382 | 118.3 |
| 13 (60% 1,6 Hexanediol/THPA - 40% PCL) | RA/REF. | 89 | 59.1 |
| 18 (67% 1,6 Hexanediol/THPA - 33% PLA) | RA/RT. | 22 | 4.3 |
| 18 (67% 1,6 Hexanediol/THPA - 33% PLA) | RA/REF. | 11 | 3.6 |
| 19 (50% 1,6 Hexanediol/THPA - 50% PLA) | RA/RT. | 15 | 2.8 |
| 19 (50% 1,6 Hexanediol/THPA - 50% PLA) | RA/REF. | 8 | 2.0 |

EXAMPLE 22

Synthesis and Oxygen Scavenging Performance Ethylene Glycol/Tetrahydrophthalic Anhydride Polyester-Polycaprolactone Block Copolymer.

Thirty grams of the ethylene glycol/tetrahydrophthalic anhydride polyester prepared in Example 2 and thirty grams of distilled caprolactone monomer were added to a 100 ml glass flask equipped with an overhead stirrer, an Argon gas purge and a thermocouple. This mixture was slowly heated to 95° C. with stirring and four drops tin (II) 2-ethylhexanoate added. The temperature was increased to 110° C. and the mixture stirred for seven hours. The reaction mixture was then discharged onto a TEFLON™-coated aluminum sheet and allowed to cool to room temperature. The resultant polymer had a $M_n$ of 14,000 and a melting point of 49.7° C. The 9921W™, with the ethylene glycol/THPA resin prepared as in Example 2. The general procedure used was as follows:

The Brabender compounder was heated above the melting point of the 9921W, >~245° C. When hot, the 9921W™ polyester resin was added to the chamber and mixed until melted. To the melt was added the EG/THPA polymer and a transesterification catalyst. Table 7 lists the specific blends as well as the catalyst amounts and types.) The blend was heated under a nitrogen flow for 10-15 minutes. At this point, additional cobalt catalyst, up to a total of 1000 ppm was added along with 1500 ppm 4,4'-dimethylbenzophenone(DMBP). The material was removed and cooled. The samples were pressed into thin films or ground into powder. Analytical test results are reported in Table 7.

From the data in Table 7, it can be seen that transesterification and insertion of the EG/THPA polymer occurred to produce a EG/THPA/PET block co-polymer. Both titanium and cobalt salts performed equally well as the transesterification catalyst. Pure EG/THPA was not readily extractable, from the prepared materials indicating that transesterification has occurred. Oxygen-scavenging testing showed increased active barrier performance for these materials.

TABLE 7

Reactive Blending Brabender Studies

| Ex. | % PET | % EG/THPA | Tg (° C.) | MP (° C.) |
|---|---|---|---|---|
| 1000 ppm Co | | | | |
| 23 | 100% Pure | 0 | 77.27 | 252.03 |
| 24 | 100% Blended | 0 | 78.05 | 255.83 |
| 25 | 95 | 5 | ~70 | 253.03 |
| 26 | 90 | 10 | 63.53 | 240.43 |
| 27 | 80 | 20 | 56.03 | 216.63 |
| 28 | 70 | 30 | 46.77 | 193.63 |
| 29 | 50 | 50 | 42.83 | — |
| 30 | 30 | 70 | 23.15 | — |
| 31 | 0 | 100 | 14.087 | — |
| 100 ppm Co | | | | |
| 32 | 100% Blended | 0 | 75.99 | 250.83 |
| 33 | 90 | 10 | 62.56 | 256.83 |
| 34 | 80 | 20 | 65.047 | 254.83 |
| 500 ppm Ti | | | | |
| 35 | 100% Blended | 0 | 74.03 | 253.43 |
| 36 | 90 | 10 | 63.07 | 245.23 |
| 37 | 80 | 20 | 53.55 | 226.23 |

EXAMPLES 38-40

Block Copolymer of Ethylene Glycol/Tetrahydrophthalic Anhydride with PET Prepared via Twin-Screw Extrusion The EG/THPA, prepared as in Example 2, was ground into a powder. PET (Eastman 9921W™) and EG/THPA were blended at 100:0, at 95:5, and at 90:10 PET:(EG/THPA) ratios with 250 ppm of cobalt neodecanoate as the transesterification catalyst in a Leistritz twin-screw extruder to form a pelletizable strand. DSC analysis of each the blends was equivalent to those from the Brabender processing of Examples 23-37. The pellets were then processed into a 2 mil cast film by introducing the formed pellets with an additional 750 ppm cobalt neodecanoate into a Leistritz twin-screw extruder equipt with a sheet die and using a vacuum take-off port to remove any volatiles. The processing temperature was 250-265° C. The resultant film was tested for oxygen scavenger performance in the manner described in Example 21 and as a barrier material. Each of the films exhibited good barrier film properties and the films formed from the block copolymers (Examples 39 and 40) had a combination of good barrier properties and good oxygen scavenging properties to provide a superior film product. The results are shown in Table 8 below.

TABLE 8

| Ex. | Polymer EG/THPA:PET RATIO | Oxygen Scavenging percent consumed | | |
|---|---|---|---|---|
| | | 0 days | 1 day | 3 days |
| 38 | 0:100 | 0.0 | 0.0 | 0.0 |
| 39 | 5:95 | 0.0 | 9.5 | 19.0 |
| 40 | 10:90 | 0.0 | 47.6 | 71.4 |

We claim:
1. A film comprising at least one layer, the layer comprising an oxygen scavenger composition consisting essentially of a transition metal salt, compound or complex and a block copolymer, wherein said block copolymer comprises:
(A) at least one first prepolymer ($P^A$) block segment composed of mer units derived from
(a) at least one or a mixture of substituted alicyclic compounds having non-aromatic, ethylenic functionality according to the following representation:

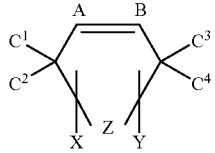

wherein
A, B, $C^1$, $C^2$, $C^3$, $C^4$ each independently represents hydrogen or a $C_qH_{2q+1}$ hydrocarbyl group with q being an integer in the range of from 0 to 20, provided that either A or B and at least one of $C^1$, $C^2$, $C^3$, $C^4$ are hydrogen atoms and each carbon atom of the alicyclic ring is fully substituted by groups selected from hydrogen, hydrocarbyl, X groups, Y groups and mixtures thereof;
X and Y each independently or together represents functional groups capable of being part of a heteroatom containing linkage forming a covalent bond linkage between the cycloalkenyl containing group and other mer groups forming the first polymer block segment; and
Z being selected from a —($C_tH_{2t}$)— hydrocarbylene group with t being an integer in the range from 1-4; and
(b) at least one or a mixture of di- or polyfunctional hydrocarbon compounds according to the following representation:

G-R'(-G)$_x$ wherein
R' represents a non-aromatic or aromatic hydrocarbon group; and
each G independently represents a functional group capable of being part of a heteroatom containing linkage between the hydrocarbon group R' and the other mer groups forming the first prepolymer block segment; and
x is at least 1: and
(B) at least one second prepolymer ($P^B$) block segment derived from a monofunctional or polyfunctional polymers represented by the formula P-(J)$_p$ wherein
P represents a polymer capable of forming a film and being thermoplastic at temperatures higher than room temperature; and
J represents functional group capable of being part of a heteroatom containing linkage forming a covalent bond linkage between the first prepolymer ($P^A$) and the second prepolymer ($P^B$) and p is 1 or 2;
wherein at least one functional group of prepolymer ($P^A$) is capable of forming heteroatom containing linkage with functional group J of prepolymer ($P^B$), polymer block segment ($P^A$) is present in from 20 to 80 weight percent and polymer block segment ($P^B$) is present in from 80 to 20 weight percent of said block copolymer and said prepolymer ($P^A$) has a $T_g$ of lower than about minus 20° C. and said prepolymer ($P^B$) has a $T_m$ of higher than +30° C.

2. The film of claim 1 wherein functional groups X, Y and G of said first prepolymer ($P^A$) are each independently selected from the group consisting of —$(CH_2)_n$—OH, —$(CH_2)_n$—$NH_2$, —$(CH_2)_n$—N=C=O and —$(Ch_2)_n$—C=O)-D with n being an integer in the range from 0 to 20 and D being selected from a halide atom or an OR group wherein R is an —H or $C_1$-$C_{12}$ alkyl group, or X and Y together or two G groups together represent —$((CH_2)_n$—C=O$)_x$-D with n being an integer in the range from 0 to 20, D is oxygen atom and x is 2, provided that said functional groups have a molar ratio of (i) hydroxyl and amino functional groups to (ii) carboxylic acid, carboxylic acid ester, carboxylic acid halide and isocyano functional groups of from 0.9:1 to 1.1:1 and sufficient to provide residual functional groups on said first prepolymer.

3. The film of claim 1 wherein the (a) of prepolymer ($P^A$) is selected from tetrahydrophthalic acid, dimethyl tetrahydrophthalate, tetrahydrophthalic anhydride or mixtures thereof.

4. The film of claim 1 wherein (b) of prepolymer ($P^A$) is selected from $C_2$-$C_{20}$ alkylene glycol or poly($C_2$-$C_4$ alkylene) glycol.

5. The film of claim 1 wherein J of the second prepolymer ($P^B$) is selected from hydroxyl or amino groups or mixtures thereof and wherein the residual functional groups of said first prepolymer ($P^A$) is selected from —$(CH_2)_n$—N=C=O and —$(CH_2)_n$—C=O)-D with n being an integer in the range from 0 to 20 and D being selected from a halide atom or an OR group wherein R is an —H or $C_1$-$C_{12}$ alkyl group or X and Y together represent $((CH_2)_n$—C=O$)_x$-D with n being an integer in the range from 0 to 20, D is oxygen atom and x is 2.

6. The film of claim 1 wherein J of the second prepolymer ($P^B$) is selected from —$(CH_2)_n$—N=C=O and —$(CH_2)_n$—C=O)-D with n being an integer in the range from 0 to 20 and D being selected from a halide atom or an OR group wherein R is an —H or $C_1$-$C_{12}$ alkyl group and wherein the residual functional groups of said first prepolymer ($P^A$) is selected from hydroxyl or amino groups or mixtures thereof.

7. The film of claim 1 wherein P of the second Prepolymer ($P^B$) is selected from $C_2$-$C_4$ polyolefins, polyesters, polystyrene, polyamide, polylactic acid, polyalkyllactone and mixtures thereof and P has a molecular weight, $M_w$, of at least 1000.

8. The film of claim 1 wherein P of the block copolymer is derived from beta-propiolactone, beta-butyrolactone, gamma-valerolactone, 1,4-dioxane-2-one, 1,4-dithiane-2,5-dione, trimethylene carbonate, neopentylene carbonate, ethylene oxalate, epsilon-caprolactone, caprolactam, lactide or glycolide or mixtures thereof.

9. A laminated product comprising a plurality of layers, including
i) at least one layer, the layer comprising an oxygen scavenger composition consisting essentially of a transition metal salt, compound or complex and a block copolymer, wherein said block copolymer comprises:
(A) at least one first prepolymer ($P^A$) block segment composed of mer units derived from
(a) at least one or a mixture of substituted alicyclic compounds having non-aromatic, ethylenic functionality according to the following representation:

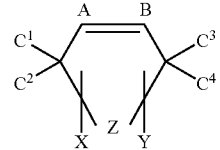

wherein
A, B, $C^1$, $C^2$, $C^3$, $C^4$ each independently represents hydrogen or a $C_qH_{2q+1}$ hydrocarbyl group with q being an integer in the range of from 0 to 20, provided that either A or B and at least one of $C^1$, $C^2$, $C^3$, $C^4$ are hydrogen atoms and each carbon atom of the alicyclic ring is fully substituted by groups selected from hydrogen, hydrocarbyl, X groups, Y groups and mixtures thereof;
X and Y each independently or together represents functional groups capable of being part of a heteroatom containing linkage forming a covalent bond linkage between the cycloalkenyl containing group and other mer groups forming the first polymer block segment; and
Z being selected from a —$(C_tH_{2t})$— hydrocarbylene group with t being an integer in the range from 1-4; and
(b) at least one or a mixture of di- or polyfunctional hydrocarbon compounds according to the following representation:

G-R'(-G)$_x$ wherein
R' represents a non-aromatic or aromatic hydrocarbon group; and
each G independently represents a functional group capable of being part of a heteroatom containing linkage between the hydrocarbon group R' and the other mer groups forming the first prepolymer block segment; and x is at least 1: and
(B) at least one second prepolymer ($P^B$) block segment derived from a monofunctional or polyfunctional polymers represented by the formula P-(J)$_p$ wherein
P represents a polymer capable of forming a film and being thermoplastic at temperatures higher than room temperature; and
J represents functional group capable of being part of a heteroatom containing linkage forming a covalent bond linkage between the first prepolymer ($P^A$) and the second prepolymer ($P^B$) and p is 1 or 2;
wherein at least one functional group of prepolymer ($P^A$) is capable of forming heteroatom containing linkage with functional group J of prepolymer ($P^B$), polymer block segment ($P^A$) is present in from 20 to 80 weight percent and polymer block segment ($P^B$) is present in from 80 to 20 weight percent of said block copolymer and said prepolymer ($P^A$) has a $T_g$ of lower than about minus 20° C. and said prepolymer ($P^B$) has a $T_m$ of higher than +30° C.; and ii) at least one layer comprising a material selected from the group consisting of
a) a polymeric article,
b) a paper article, and
c) a metal article.

10. The laminated product of claim 9 wherein functional groups X, Y and G of said first prepolymer ($P^A$) are each independently selected from the group consisting of —$(CH_2)_n$—OH, —$(CH_2)_n$—$NH_2$, —$(CH_2)_n$—N=C=O and —$(CH_2)_n$—C(=O)-D with n being an integer in the range from 0 to 20 and D being selected from a halide atom or an OR group wherein R is an —H or $C_1C_{12}$ alkyl group, or X and Y together or two G groups together represent —$((CH_2)_n$—C=O$)_x$-D with n being an integer in the range from 0 to 20, D is oxygen atom and x is 2, provided that said functional groups have a molar ratio of (i) hydroxyl and amino functional groups to (ii) carboxylic acid, carboxylic acid ester, carboxylic acid halide and isocyano functional groups of from 0.9:1 to 1.1:1 and sufficient to provide residual functional groups on said first prepolymer.

11. The laminated product of claim 9 wherein the (a) of prepolymer ($P^A$) is selected from tetrahydrophthalic acid, dimethyl tetrahydrophthalate, tetrahydrophthalic anhydride or mixtures thereof.

12. The laminated product of claim 9 wherein (b) of prepolymer ($P^A$) is selected from $C_2$-$C_{20}$ alkylene glycol or poly($C_2$-$C_4$ alkylene)glycol.

13. The laminated product of claim 9 wherein J of the second prepolymer ($P^B$) is selected from hydroxyl or amino groups or mixtures thereof and wherein the residual functional groups of said first prepolymer ($P^A$) is selected from —$(CH_2)_n$—N=C=O and —$(CH_2)_n$—C(=O)-D with n being an integer in the range from 0 to 20 and D being selected from a halide atom or an OR group wherein R is an —H or $C_1$-$C_{12}$ alkyl group or X and Y together represent —$((CH_2)_n$—C=O$)_x$-D with n being an integer in the range from 0 to 20, D is oxygen atom and x is 2.

14. The laminated product of claim 9 wherein J of the second prepolymer ($P^B$) is selected from —$(CH_2)_n$—N=C=O and —$(CH_2)_n$—C(=O)-D with n being an integer in the range from 0 to 20 and D being selected from a halide atom or an OR group wherein R is an —H or $C_1$-$C_{12}$ alkyl group and wherein the residual functional groups of said first prepolymer ($P^A$) is selected from hydroxyl or amino groups or mixtures thereof.

15. The laminated product of claim 9 wherein P of the block copolymer derived from second prepolymer ($P^B$) is selected from $C_2$-$C_4$ polyolefins, polyesters, polystyrene, polyamide, polylactic acid, polyalkyllactone and mixtures thereof and P has a molecular weight, $M_w$, of at least 1000.

16. The laminated product of claim 9 wherein P of the block copolymer derived from second prepolymer ($P^B$) is selected from beta-propiolactone, beta-butyrolactone, gamma-valerolactone, 1,4-dioxane-2-one, 1,4-dithiane-2,5-dione, trimethylene carbonate, neopentylene carbonate, ethylene oxalate, epsilon-caprolactone, caprolactam, lactide or glycolide or mixtures thereof.

17. An oxygen scavenger composition consisting essentially of a transition metal salt, compound or complex and a block copolymer, wherein said block copolymer comprises:

(A) at least one first prepolymer ($P^A$) block segment composed of mer units derived from
(a) at least one or a mixture of substituted alicyclic compounds having non-aromatic, ethylenic functionality according to the following representation:

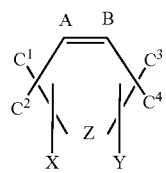

wherein
A, B, $C^1$, $C^2$, $C^3$, $C^4$ each independently represents hydrogen or a $C_qH_{2q+1}$ hydrocarbyl group with q being an integer in the range of from 0 to 20, provided that either A or B and at least one of $C^1$, $C^2$, $C^3$, $C^4$ are hydrogen atoms and each carbon atom of the alicyclic ring is fully substituted by groups selected from hydrogen, hydrocarbyl, X groups, Y groups and mixtures thereof;

X and Y each independently or together represents functional groups capable of being part of a heteroatom containing linkage forming a covalent bond linkage between the cycloalkenyl containing group and other mer groups forming the first polymer block segment; and Z being selected from a —$(C_tH_{2t})$— hydrocarbylene group with t being an integer in the range from 1-4; and (b) at least one or a mixture of di- or polyfunctional hydrocarbon compounds according to the following representation:

wherein
R' represents a non-aromatic or aromatic hydrocarbon group; and
each G independently represents a functional group capable of being part of a heteroatom containing linkage between the hydrocarbon group R' and the other mer groups forming the first prepolymer block segment; and x is at least 1: and (B) at least one second prepolymer ($P^B$) block segment derived from a monofunctional or polyfunctional polymers represented by the formula

wherein
P represents a polymer capable of forming a film and being thermoplastic at temperatures higher than room temperature; and
J represents functional group capable of being part of a heteroatom containing linkage forming a covalent bond linkage between the first prepolymer ($P^A$) and the second prepolymer($P^B$) and p is 1or 2;

wherein at least one functional group of prepolymer ($P^A$) is capable of forming heteroatom containing linkage with functional group J of prepolymer ($P^B$), polymer block segment ($P^A$) is present in from 20 to 80 weight percent and polymer block segment ($P^B$) is present in from 80 to 20 weight percent of said block copolymer percent of said block copolymer and said prepolymer ($P^A$) has a $T_g$ of lower than about minus 20° C. and said prepolymer ($P^B$) has a $T_m$ of higher than +30° C.

18. The composition of claim 17 wherein functional groups X, Y and G of said first prepolymer ($P^A$) are each independently selected from the group consisting of —$(CH_2)_n$—OH, —$(CH_2)_n$—$NH_2$, —$(CH_2)_n$—N=C=O and —$(CH_2)_n$—C=O)-D with n being an integer in the range from 0 to 20 and D being selected from a halide atom or an OR group wherein R is an —H or $C_1$-$C_{12}$ alkyl group, or X and Y together or two G groups together represent —$((CH_2)_n$—C=O)$_x$-D with n being an integer in the range from 0 to 20, D is oxygen atom and x is 2, provided that said functional groups have a molar ratio of (i) hydroxyl and amino functional groups to (ii) carboxylic acid, carboxylic acid ester, carboxylic acid halide and isocyano functional groups of from 0.9:1 to 1.1:1 and sufficient to provide residual functional groups on said first prepolymer.

19. The composition of claim 17 wherein the (a) of prepolymer ($P^A$) is selected from tetrahydrophthalic acid, dimethyl tetrahydrophthalate, tetrahydrophthalic anhydride or mixtures thereof.

20. The composition of claim 17 wherein (b) of prepolymer ($P^A$) is selected from $C_2$-$C_{20}$ alkylene glycol or poly($C_2$-$C_4$ alkylene)glycol.

21. The composition of claim 17 wherein the first prepolymer ($P^A$) of the block copolymer comprises mer units derived from
(a) cis-1,2,3,6-tetrahydrophthalic anhydride; and
(b) 1,6-hexanediol.

22. The composition of claim 17 wherein J of the second prepolymer ($P^B$) is selected from hydroxyl or amino groups or mixtures thereof and wherein the residual functional groups of said first prepolymer ($P^A$) is selected from —$(CH_2)_n$—N=C=O and —$(CH_2)_n$—C=O)-D with n being an integer in the range from 0 to 20 and D being selected from a halide atom or an OR group wherein R is an —H or $C_1$-$C_{12}$ alkyl group or X and Y together represent —$((CH_2)_n$—C=O)$_x$-D with n being an integer in the range from 0 to 20, D is oxygen atom and x is 2.

23. The composition of claim 17 wherein J of the second prepolymer ($P^B$) is selected from —$(CH_2)_n$—N=C=O and —$(CH_2)_n$C=O)-D with n being an integer in the range from 0 to 20 and D being selected from a halide atom or an OR group wherein R is an —H or $C_1$-$C_{12}$ alkyl group and wherein the residual functional groups of said first prepolymer ($P^A$) is selected from hydroxyl or amino groups or mixtures thereof.

24. The composition of claim 17 wherein P of the second prepolymer ($P^B$) is selected from $C_2$-$C_4$ polyolefins, polyesters, polystyrene, polyamide, polylactic acid, polyalkyllactone and mixtures thereof and P has a molecular weight, Mw, of at least 1000.

25. The composition of claim 17 wherein P of the block copolymer is derived from beta-propiolactone, beta-butyrolactone, gamma-valerolactone, 1,4-dioxane-2-one, 1,4-dithiane-2,5-dione, trimethylene carbonate, neopentylene carbonate, ethylene oxalate, epsilon-caprolactone, caprolactam, lactide or glycolide or mixtures thereof.

26. The composition of claim 17 wherein the transition metal salt is selected from the group consisting of cobalt neodecanoate, cobalt 2-ethylhexanoate, cobalt oleate, cobalt acetylacetonate, and cobalt 2-ethylbutyrate.

27. The composition of claim 17 wherein the composition comprises an effective amount of a photoinitiator.

28. The composition of claim 17 wherein the composition comprises a diluent polymer selected from the group consisting of polyester, polyamides, polycarbonates, polyurethanes and polyethers, ethylene polymers or copolymers, acrylate polymers, ethylene-vinyl alcohol copolymer, polypropylene and polypropylene copolymers, styrene polymers and styrene copolymers, vinyl chloride polymer and vinyl chloride copolymers, polyvinylidene polymers and copolymers and mixtures thereof.

* * * * *